US011726108B2

(12) United States Patent
Pu et al.

(10) Patent No.: US 11,726,108 B2
(45) Date of Patent: Aug. 15, 2023

(54) SIGNAL CONDITIONING SYSTEM FOR IMPROVING LOW-FREQUENCY MEASUREMENT PERFORMANCE OF ACCELERATION SENSOR

(71) Applicant: Shanghai University, Shanghai (CN)

(72) Inventors: Huayan Pu, Shanghai (CN); Peng Jiang, Shanghai (CN); Jiheng Ding, Shanghai (CN); Yi Sun, Shanghai (CN); Min Wang, Shanghai (CN); Yan Peng, Shanghai (CN); Jun Luo, Shanghai (CN); Shaorong Xie, Shanghai (CN)

(73) Assignee: Shanghai University, Shanghai (CN)

( * ) Notice: Subject to any disclaimer, the term of this patent is extended or adjusted under 35 U.S.C. 154(b) by 0 days.

(21) Appl. No.: 17/754,368

(22) PCT Filed: Aug. 27, 2021

(86) PCT No.: PCT/CN2021/114937
§ 371 (c)(1),
(2) Date: Mar. 30, 2022

(87) PCT Pub. No.: WO2022/042677
PCT Pub. Date: Mar. 3, 2022

(65) Prior Publication Data
US 2022/0357358 A1 Nov. 10, 2022

(30) Foreign Application Priority Data

Aug. 27, 2020 (CN) .......................... 202010876594.8

(51) Int. Cl.
*G01P 21/00* (2006.01)
(52) U.S. Cl.
CPC .................... *G01P 21/00* (2013.01)
(58) Field of Classification Search
CPC ................................. G01P 21/00; G01P 21/02
(Continued)

(56) References Cited

U.S. PATENT DOCUMENTS 5,130,600 A 7/1992 Tomita et al.

FOREIGN PATENT DOCUMENTS

| CN | 202631100 U | 12/2012 |
| CN | 204836096 U | 12/2015 |

(Continued)

OTHER PUBLICATIONS

International Search Report corresponding to PCT/CN2021/114937; dated Nov. 3, 2021 (6 pages, including English translation).
(Continued)

*Primary Examiner* — Robert R Raevis
(74) *Attorney, Agent, or Firm* — Myers Bigel, P.A.

(57) ABSTRACT

The present disclosure relates to a signal conditioning system for improving low-frequency measurement performance of an acceleration sensor. The signal conditioning system includes: a charge integration circuit, a high-pass filter circuit, a lead-lag network, an anti-aliasing filter circuit, and a gain adjustment circuit. An input terminal of the charge integration circuit is connected to the acceleration sensor, an output terminal of the charge integration circuit is connected to an input terminal of the high-pass filter circuit, an output terminal of the high-pass filter circuit is connected to an input terminal of the lead-lag network, an output terminal of the lead-lag network is connected to an input terminal of the anti-aliasing filter circuit, and an output terminal of the anti-aliasing filter circuit is connected to an input terminal of the gain adjustment circuit.

8 Claims, 4 Drawing Sheets

(58) Field of Classification Search
USPC .......................................................... 73/1.38
See application file for complete search history.

(56) References Cited

FOREIGN PATENT DOCUMENTS

| CN | 107192445 A | 9/2017 |
| CN | 108645503 A | 10/2018 |
| CN | 108762331 A | 11/2018 |
| CN | 112014598 A | 12/2020 |

OTHER PUBLICATIONS

Translation of Office Action for corresponding Chinese Application No. 202010876594.8, dated Mar. 24, 2021, 7 pages.

SIGNAL CONDITIONING SYSTEM FOR IMPROVING LOW-FREQUENCY MEASUREMENT PERFORMANCE OF ACCELERATION SENSOR

CROSS REFERENCE TO RELATED APPLICATIONS

This present application is a national stage entry of International Application No. PCT/CN2021/114937, which was filed on Aug. 27, 2021, and which claims priority to Chinese Patent Application No. 202010876594.8, filed with the China National Intellectual Property Administration (CNIPA) on Aug. 27, 2020 and entitled "SIGNAL CONDITIONING SYSTEM FOR IMPROVING LOW-FREQUENCY MEASUREMENT PERFORMANCE OF ACCELERATION SENSOR", each of which is incorporated herein by reference in its entirety.

TECHNICAL FIELD

The present disclosure relates to the field of active vibration control, and in particular to a signal conditioning system for improving low-frequency measurement performance of an acceleration sensor.

BACKGROUND ART

In the field of active vibration reduction, active vibration control relies on accurate measurement of vibration by the sensor. Therefore, the ability of the sensor to measure vibration directly affects the performance of active vibration control. Piezoelectric acceleration sensors are widely used in the application of active vibration reduction due to their wide frequency measurement range, light weight, large measurement range, impact resistance, and sturdiness and durability.

Inside the piezoelectric acceleration sensor, vibration acceleration is measured by using the structure of a spring mass system and material properties of piezoelectric materials. The core mass inside the sensor is affected by the vibration acceleration to generate a force proportional to the acceleration on the piezoelectric material. After the piezoelectric material is stressed, it will form a charge signal on its own surface. The charge signal can be converted into a voltage signal after integral conditioning. The active vibration reduction system obtains acceleration information by reading the voltage signal, and then realizes the active control of vibration. However, the internal structure of the spring mass system makes the amplitude-frequency response and phase response of a sensor output signal exhibit the characteristics of amplitude attenuation and phase lead at low frequencies respectively, which will affect the performance of active control. In feedforward control, a forward channel model constructed in the system will deviate from an ideal forward channel model due to the influence of the low-frequency characteristics of the sensor, resulting in the loss of accuracy in forward channel modeling of vibration transmission, and the performance of feedforward control is therefore deteriorated. While in feedback control, the low-frequency characteristics of the sensor will affect the amplitude margin and phase margin of the active vibration reduction system at low frequencies, complicating the stability of the system and limiting the control performance of the feedback control.

In order to give full play to the application advantages of the piezoelectric acceleration sensors in active vibration reduction, the dynamic characteristics of the sensor need to be corrected and compensated at low frequencies, so as to improve the low-frequency measurement performance of the sensor, thereby improving the vibration control performance of the active vibration reduction system. However, the low-frequency dynamic characteristics of the sensor will change under the influence of time and temperature, specifically, the cut-off frequency of the low-frequency measurement bandwidth of the sensor moves to a high frequency, and the low-frequency measurement performance is degraded. In addition, the low-frequency dynamic characteristics of the sensor are also closely related to factors such as material characteristics, sensor design, and processing technology. The actual performance parameters of different types of sensors are different, and there are also differences between different individuals of the same type of sensor. These differences will eventually be reflected in the low-frequency dynamic characteristics of the sensor. Therefore, during correction and compensation of the low-frequency dynamic characteristics of the piezoelectric acceleration sensor, it is necessary to consider the influence of these differences.

In practical application, the low-frequency dynamic characteristics of the sensor are often corrected and compensated using the digital circuit technology. This type of method calculates and processes the output signal of the sensor through software, establishes an inverse model to compensate the dynamic characteristics of the sensor, and expands the measurement bandwidth of the sensor to the low frequency, so as to correct the low-frequency dynamic characteristics of the sensor and enhance its low-frequency measurement performance. However, the amplitude response of the piezoelectric acceleration sensor exhibits the characteristics of amplitude attenuation at low frequencies. When the frequency of an input signal is lower than the cut-off frequency of the sensor at low frequencies, the signal will attenuate rapidly. The low-frequency signal amplitude is small, so when the low-frequency signals are sampled using a digital circuit, it will generate large quantization noise, and the low-frequency signal has a poor signal-to-noise ratio. This problem will lead to deterioration of the vibration control effect of the active vibration reduction system at low frequencies.

Therefore, there is an urgent need in the art for a technology suitable for a signal conditioning circuit for a piezoelectric acceleration sensor to improve the vibration control effect of the active vibration reduction system at low frequencies, thereby realizing accurate measurement of vibration by the sensor.

SUMMARY

An objective of the present disclosure is to provide a signal conditioning system for improving low-frequency measurement performance of an acceleration sensor, so as to improve the vibration control effect of an active vibration reduction system at low frequencies, thereby realizing accurate measurement of vibration by the sensor.

To implement the above objective, the present disclosure provides the following solutions:

A signal conditioning system for improving low-frequency measurement performance of an acceleration sensor includes: a charge integration circuit, a high-pass filter circuit, a lead-lag network, an anti-aliasing filter circuit, and a gain adjustment circuit.

An input terminal of the charge integration circuit is connected to the acceleration sensor, an output terminal of the charge integration circuit is connected to an input terminal of the high-pass filter circuit, an output terminal of the high-pass filter circuit is connected to an input terminal of the lead-lag network, an output terminal of the lead-lag network is connected to an input terminal of the anti-aliasing filter circuit, and an output terminal of the anti-aliasing filter circuit is connected to an input terminal of the gain adjustment circuit.

The charge integration circuit is used to convert a charge signal generated by measurement of the acceleration sensor into a voltage signal for operational amplification of the circuit; the high-pass filter circuit is used to filter a direct current (DC) component in the voltage signal for the operational amplification of the circuit; the lead-lag network is used to expand a measurement bandwidth of the acceleration sensor to a low-frequency band; the anti-aliasing filter circuit is used to adjust a constraint bandwidth of an output signal; and the gain adjustment circuit is used to adjust an output gain of the output signal.

Optionally, the charge integration circuit may include: a first capacitor and a first operational amplifier.

An input terminal of the first capacitor and a second input terminal of the first operational amplifier may be both connected to the acceleration sensor, and an output terminal of the first capacitor and an output terminal of the first operational amplifier may be both connected to the input terminal of the high-pass filter circuit; and a first input terminal of the first operational amplifier may be grounded.

Optionally, the high-pass filter circuit may include: a second capacitor, a first resistor, and a second operational amplifier.

An input terminal of the second capacitor may be connected to the output terminal of the charge integration circuit, an output terminal of the second capacitor may be connected to an input terminal of the first resistor and a first input terminal of the second operational amplifier respectively, an output terminal of a first capacitor may be grounded, a second input terminal of the second operational amplifier may be connected to an output terminal of the second operational amplifier, and the output terminal of the second operational amplifier may be further connected to the input terminal of the lead-lag network.

Optionally, a transfer function of the high-pass filter circuit may be determined by a formula $$H_{102} = \frac{s}{s + \frac{1}{R_1 C_2}},$$

S may be a complex variable, may represent a complex frequency, and may be obtained by performing Laplace transform on a differential equation of a circuit model, $R_1$ may be a value of the first resistor, and $C_2$ may be a value of the second capacitor.

Optionally, the lead-lag network may include: a second resistor, a third resistor, a third capacitor, a fourth resistor, a fifth resistor, a sixth resistor, a seventh resistor, a fourth capacitor, and a third operational amplifier; and the second resistor, the third resistor, the fifth resistor, and the seventh resistor may be all adjustable resistors.

An input terminal of the second resistor may be connected to the output terminal of the high-pass filter circuit, an output terminal of the second resistor may be connected to an input terminal of the third resistor and an input terminal of the fourth resistor respectively, an output terminal of the third resistor may be connected to an input terminal of the third capacitor, an output terminal of the third capacitor may be grounded, an output terminal of the fourth resistor may be connected to an input terminal of the fifth resistor and a second input terminal of the third operational amplifier respectively, an output terminal of the fifth resistor may be connected to an input terminal of the seventh resistor and an input terminal of the fourth capacitor respectively, an output terminal of the seventh resistor and an output terminal of the fourth capacitor may be both connected to an output terminal of the third operational amplifier, the output terminal of the third operational amplifier may be further connected to the anti-aliasing filter circuit, one terminal of the sixth resistor may be connected to a first input terminal of the third operational amplifier, and the other terminal of the sixth resistor may be grounded.

Optionally, a transfer function of the lead-lag network may be determined by a formula $$H_{103} = \frac{R_3 R_5 C_3}{(R_2 + R_3) R_4 C_3} \cdot \frac{s + \frac{1}{R_3 C_3}}{s + \frac{1}{(R_2 + R_3) C_3}} \cdot \frac{s + \frac{R_5 + R_7}{R_5 R_7 C_4}}{s + \frac{1}{R_7 C_4}},$$

$R_2$ may be a value of the second resistor, $R_3$ may be a value of the third resistor, $R_4$ may be a value of the fourth resistor, $R_5$ may be a value of the fifth resistor, $R_4$ may be a value of the seventh resistor, $C_3$ may be a value of the third capacitor, $C_4$ may be a value of the fourth capacitor, and S may be a complex variable, may represent a complex frequency, and may be obtained by performing Laplace transform on a differential equation of a circuit model.

Optionally, the anti-aliasing filter circuit may include: an eighth resistor, a fifth capacitor, a ninth resistor, a tenth resistor, an eleventh resistor, a sixth capacitor, and a fourth operational amplifier; and the ninth resistor and the eleventh resistor may be both adjustable resistors.

An input terminal of the eighth resistor may be connected to the output terminal of the lead-lag network, an output terminal of the eighth resistor may be connected to an input terminal of the ninth resistor and an input terminal of the fifth capacitor respectively, an output terminal of the ninth resistor may be connected to an input terminal of the eleventh resistor, an input terminal of the sixth capacitor, and a second input terminal of the fourth operational amplifier respectively, an output terminal of the eleventh resistor, an output terminal of the sixth capacitor, and an output terminal of the fourth operational amplifier may be all connected to the input terminal of the gain adjustment circuit, one terminal of the tenth resistor may be connected to a first input terminal of the fourth operational amplifier, and the other terminal of the tenth resistor and an output terminal of the fifth capacitor may be both grounded.

Optionally, a transfer function of the anti-aliasing filter circuit may be determined by a formula $$H_{104} = -\frac{1}{R_8 R_{11} C_5 C_6} \cdot \frac{1}{s + \frac{1}{R_9 C_5}} \cdot \frac{1}{s + \frac{1}{R_{11} C_6}},$$

$R_8$ may be a value of the eighth resistor, $R_9$ may be a value of the ninth resistor, $R_{11}$ may be a value of the eleventh resistor, $C_5$ may be a value of the fifth capacitor, $C_6$ may be a value of the sixth capacitor, and S may be a complex variable, may represent a complex frequency, and may be obtained by performing Laplace transform on a differential equation of a circuit model.

Optionally, the gain adjustment circuit may include: a twelfth resistor, a thirteenth resistor, a fourteenth resistor, and a fifth operational amplifier; and the fourteenth resistor may be an adjustable resistor.

An input terminal of the twelfth resistor may be connected to the output terminal of the anti-aliasing filter circuit, an output terminal of the twelfth resistor may be connected to an input terminal of the fourteenth resistor and a second input terminal of the fifth operational amplifier respectively, an output terminal of the fourteenth resistor may be connected to an output terminal of the fifth operational amplifier, one terminal of the thirteenth resistor may be connected to a first input terminal of the fifth operational amplifier, and the other terminal of the thirteenth resistor may be grounded.

Based on specific embodiments provided by the present disclosure, the present disclosure has the following technical effects:

The signal conditioning system for improving low-frequency measurement performance of an acceleration sensor provided by the present disclosure processes the charge signal output by the acceleration sensor and converts it into the usable voltage signal. Without changing an internal structure of the sensor, the lead-lag network is added to the signal conditioning system to correct low-frequency dynamic characteristics of the sensor system. Relevant parameters in the lead-lag network are flexibly adjustable and can be adjusted in real time according to actual needs. The present disclosure improves the vibration control effect of an active vibration reduction system at low frequencies, thereby realizing accurate measurement of vibration by the sensor.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following descriptions show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely a part rather than all of the embodiments of the present disclosure. Based on the embodiments of the present disclosure, all other embodiments obtained by those of ordinary skill in the art without creative efforts shall fall within the protection scope of the present disclosure.

An objective of the present disclosure is to provide a signal conditioning system for improving low-frequency measurement performance of an acceleration sensor, so as to improve the vibration control effect of an active vibration reduction system at low frequencies, thereby realizing accurate measurement of vibration by the sensor.

To make the above objectives, features, and advantages of the present disclosure clearer and more comprehensible, the present disclosure will be further described in detail below with reference to the accompanying drawings and the specific implementations.

Figure 1:
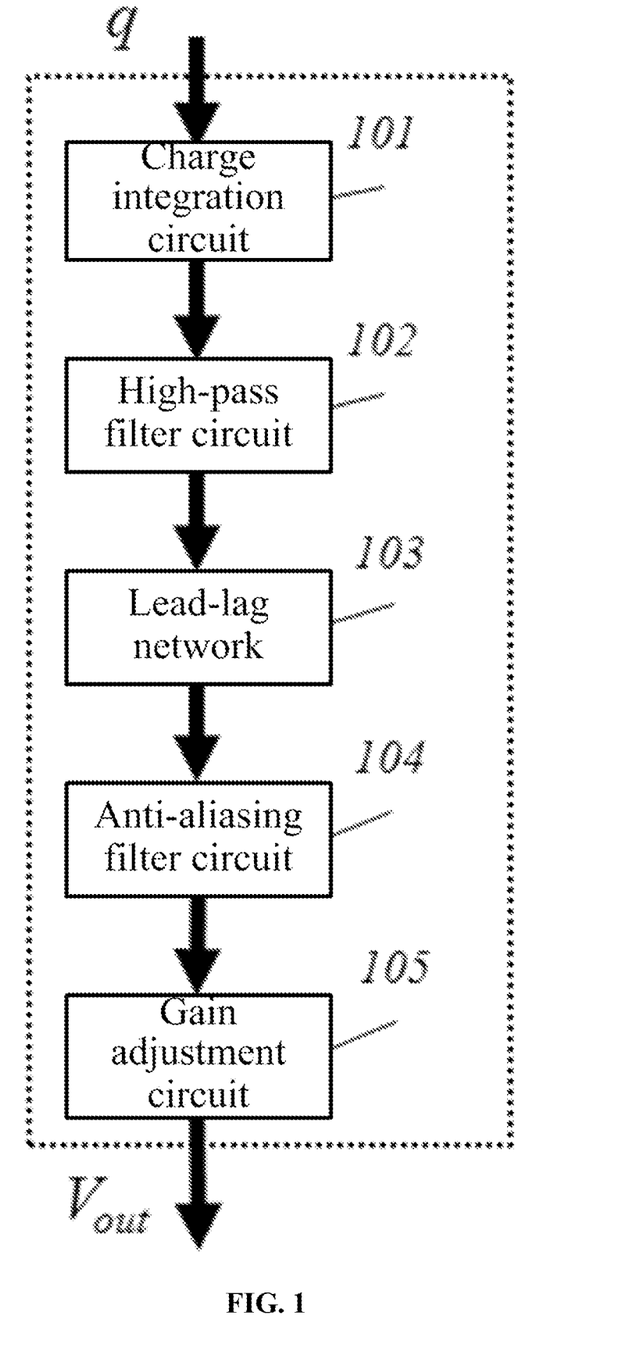
FIG. 1 is a schematic structural diagram of a signal conditioning system for improving low-frequency measurement performance of an acceleration sensor provided by the present disclosure.

FIG. 1 is a schematic structural diagram of a signal conditioning system for improving low-frequency measurement performance of an acceleration sensor provided by the present disclosure. As shown in FIG. 1, the signal conditioning system for improving low-frequency measurement performance of an acceleration sensor provided by the present disclosure includes: a charge integration circuit 101, a high-pass filter circuit 102, a lead-lag network 103, an anti-aliasing filter circuit 104, and a gain adjustment circuit 105. In FIG. 1, q is at a signal input port of the signal conditioning system, $V_{out}$ is at a signal output port of a signal conditioning circuit, q is a charge signal generated by measurement of the acceleration sensor, and $V_{out}$ is a voltage signal output by the signal conditioning circuit.

An input terminal of the charge integration circuit 101 is connected to the acceleration sensor, an output terminal of the charge integration circuit 101 is connected to an input terminal of the high-pass filter circuit 102, an output terminal of the high-pass filter circuit 102 is connected to an input terminal of the lead-lag network 103, an output terminal of the lead-lag network 103 is connected to an input terminal of the anti-aliasing filter circuit 104, and an output terminal of the anti-aliasing filter circuit 104 is connected to an input terminal of the gain adjustment circuit 105.

The charge integration circuit 101 is used to convert the charge signal generated by measurement of the acceleration sensor into the voltage signal for operational amplification of the circuit.

The high-pass filter circuit 102 is used to filter a DC component in the voltage signal for the operational amplification of the circuit.

The lead-lag network 103 is used to expand a measurement bandwidth of the acceleration sensor to a low-frequency band.

The anti-aliasing filter circuit 104 is used to adjust a constraint bandwidth of an output signal. The gain adjustment circuit 105 is used to adjust an output gain of the output signal.

Figure 2:
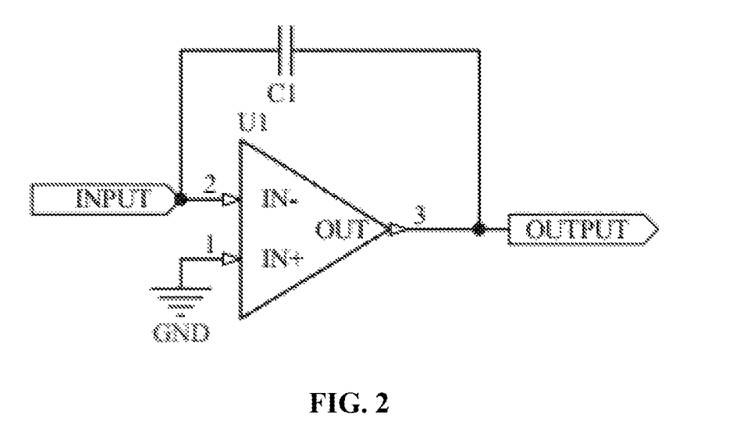
FIG. 2 is a schematic structural diagram of a charge integration circuit provided by the present disclosure.

FIG. 2 is a schematic structural diagram of the charge integration circuit 101 provided by the present disclosure. As shown in FIG. 2, the charge integration circuit 101 includes: a first capacitor C1 and a first operational amplifier U1.

An input terminal of the first capacitor C1 and a second input terminal of the first operational amplifier U1 are both connected to the acceleration sensor, and an output terminal of the first capacitor C1 and an output terminal of the first operational amplifier U1 are both connected to the input terminal of the high-pass filter circuit 102. A first input terminal of the first operational amplifier U1 is grounded.

Figure 3:
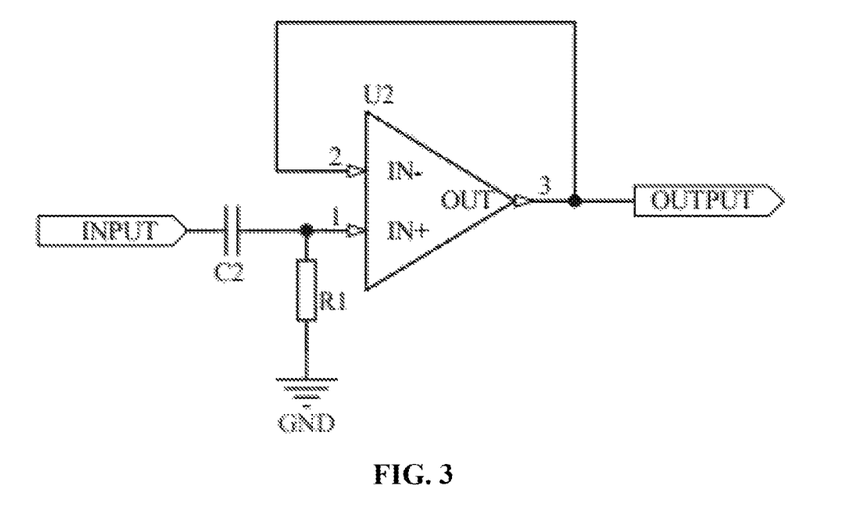
FIG. 3 is a schematic structural diagram of a high-pass filter circuit provided by the present disclosure.

FIG. 3 is a schematic structural diagram of the high-pass filter circuit 102 provided by the present disclosure. As shown in FIG. 3, the high-pass filter circuit 102 includes: a second capacitor C2, a first resistor R1, and a second operational amplifier U2.

An input terminal of the second capacitor C2 is connected to the output terminal of the charge integration circuit 101, an output terminal of the second capacitor C2 is connected to an input terminal of the first resistor R1 and a first input terminal of the second operational amplifier U2 respectively, an output terminal of the first capacitor C1 is grounded, a second input terminal of the second operational amplifier U2 is connected to an output terminal of the second operational amplifier U2, and the output terminal of the second operational amplifier U2 is further connected to the input terminal of the lead-lag network 103.

A transfer function of the high-pass filter circuit 102 is determined by a formula $$H_{102} = \frac{s}{s + \frac{1}{R_1 C_2}},$$

S is a complex variable, represents a complex frequency, and is obtained by performing Laplace transform on a differential equation of a circuit model, $R_1$ is a value of the first resistor R1, and $C_2$ is a value of the second capacitor C2.

According to the cut-off frequency required by the high-pass filter circuit 102, a product of the value of the first resistor R1 and a value of the first capacitor C1 can be calculated, an appropriate value of the first resistor R1 is selected from resistance values of standard resistors, and then the value of the first capacitor C1 is further calculated from the above product. That is, the resistance value and the capacitance value of the high-pass filter circuit 102 are selected by calculation, such that the high-pass filter circuit 102 has very low cut-off frequency, filters the DC component in the circuit signal, and avoids circuit instability caused by the problem of circuit saturation.

Figure 4:
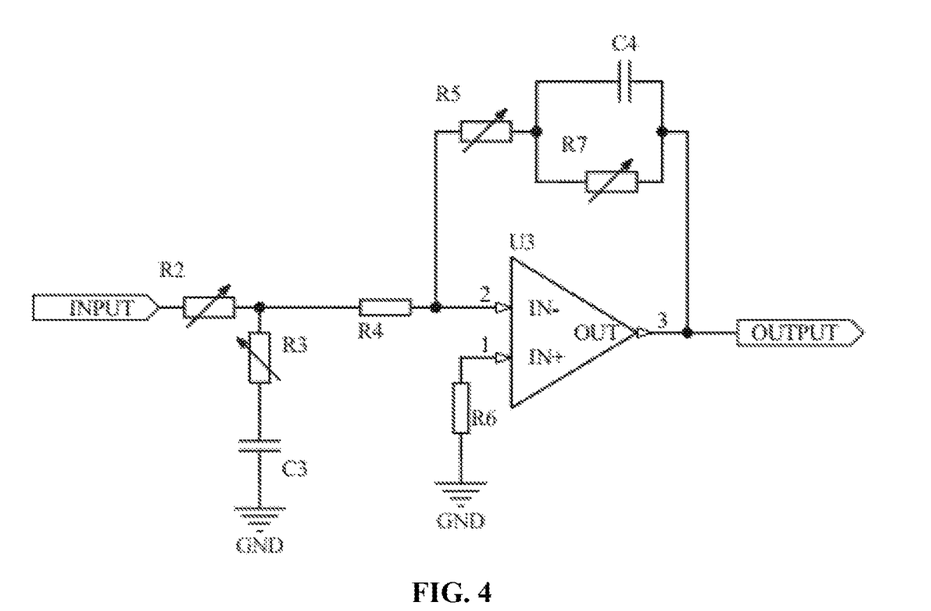
FIG. 4 is a schematic structural diagram of a lead-lag network provided by the present disclosure.

FIG. 4 is a schematic structural diagram of the lead-lag network 103 provided by the present disclosure. As shown in FIG. 4, the lead-lag network 103 includes: a second resistor R2, a third resistor R3, a third capacitor C3, a fourth resistor R4, a fifth resistor R5, a sixth resistor R6, a seventh resistor R7, a fourth capacitor C4, and a third operational amplifier U3. The second resistor R2, the third resistor R3, the fifth resistor R5, and the seventh resistor R7 are all adjustable resistors.

An input terminal of the second resistor R2 is connected to the output terminal of the high-pass filter circuit 102, an output terminal of the second resistor R2 is connected to an input terminal of the third resistor R3 and an input terminal of the fourth resistor R4 respectively, an output terminal of the third resistor R3 is connected to an input terminal of the third capacitor C3, an output terminal of the third capacitor C3 is grounded, an output terminal of the fourth resistor R4 is connected to an input terminal of the fifth resistor R5 and a second input terminal of the third operational amplifier U3 respectively, an output terminal of the fifth resistor R5 is connected to an input terminal of the seventh resistor R7 and an input terminal of the fourth capacitor C4 respectively, an output terminal of the seventh resistor R7 and an output terminal of the fourth capacitor C4 are both connected to an output terminal of the third operational amplifier U3, the output terminal of the third operational amplifier U3 is further connected to the anti-aliasing filter circuit 104, one terminal of the sixth resistor R6 is connected to a first input terminal of the third operational amplifier U3, and the other terminal of the sixth resistor R6 is grounded.

A transfer function of the lead-lag network 103 is determined by a formula $$H_{103} = \frac{R_3 R_5 C_3}{(R_2 + R_3) R_4 C_3} \cdot \frac{s + \frac{1}{R_3 C_3}}{s + \frac{1}{(R_2 + R_3) C_3}} \cdot \frac{s + \frac{R_5 + R_7}{R_5 R_7 C_4}}{s + \frac{1}{R_7 C_4}},$$

$R_2$ is a value of the second resistor R2, $R_3$ is a value of the third resistor R3, $R_4$ is a value of the fourth resistor R4, $R_5$ is a value of the fifth resistor R5, $R_7$ is a value of the seventh resistor R7, $C_3$ is a value of the third capacitor C3, $C_4$ is a value of the fourth capacitor C4, and S is a complex variable, represents a complex frequency, and is obtained by performing Laplace transform on the differential equation of the circuit model.

The lead-lag network 103 is added, such that the dynamic characteristics of the acceleration sensor system in the low-frequency band are changed to realize the correction of the dynamic characteristics in the low-frequency band. After correction, the transfer function of the acceleration sensor system changes, the measurement bandwidth of the acceleration sensor is expanded to the low-frequency band, and the low-frequency measurement capability of the acceleration sensor is improved.

The second resistor R2, the third resistor R3, the fifth resistor R5, and the seventh resistor R7 in the lead-lag network are all adjustable resistors. The corner frequency of a first-order differential link in a lag network can be adjusted by changing the value of the second resistor R2, and the corner frequency of a first-order integral link in the lag network can be adjusted by changing the value of the third resistor R3. Similarly, the corner frequency of a first-order differential link in a lead network can be adjusted by changing the value of the fifth resistor R5, and the corner frequency of a first-order integral link in the lead network can be adjusted by changing the value of the seventh resistor R7. Combined with actual acceleration sensor characteristics and low-frequency performance requirements, the above four links work together by changing the resistance values of the adjustable resistors, so as to complete the correction of the low-frequency dynamic characteristics of the acceleration sensor system, which has good object practicability and environmental adaptability.

Furthermore, during actual use of the circuit, a method for correcting the low-frequency dynamic performance of the acceleration sensor is as follows: first, the value of the third resistor R3 is determined according to the low-frequency cut-off frequency of the actual sensor, then the low-frequency cut-off frequency is obtained according to the need after correction, the values of the second resistor R2 and the seventh resistor R7 are further determined, and finally the value of the fifth resistor R5 is determined.

Figure 5:
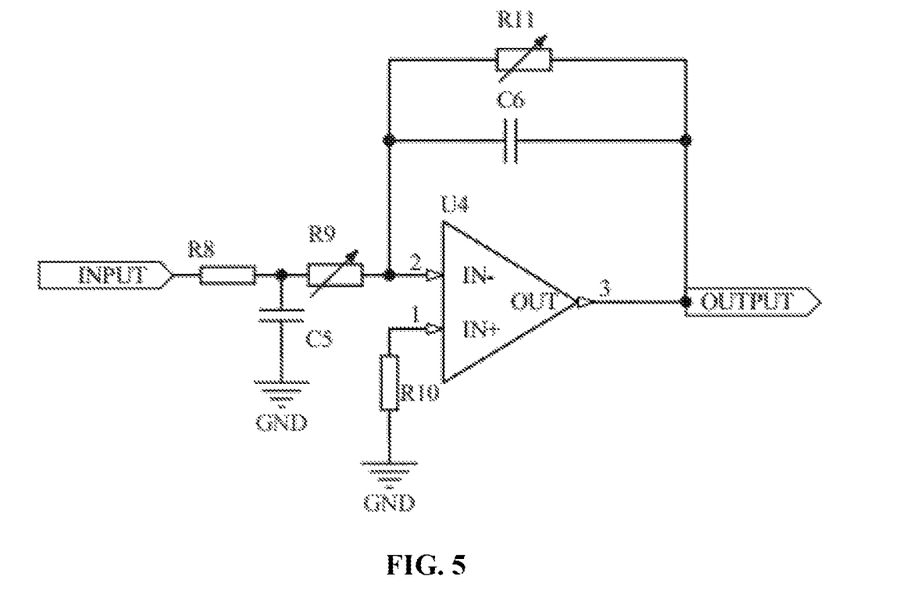
FIG. 5 is a schematic structural diagram of an anti-aliasing filter circuit provided by the present disclosure.

FIG. 5 is a schematic structural diagram of the anti-aliasing filter circuit 104 provided by the present disclosure. As shown in FIG. 5, the anti-aliasing filter circuit 104 includes: an eighth resistor R8, a fifth capacitor C5, a ninth resistor R9, a tenth resistor R10, an eleventh resistor R11, a sixth capacitor C6, and a fourth operational amplifier U4. The ninth resistor R9 and the eleventh resistor R11 are both adjustable resistors.

An input terminal of the eighth resistor R8 is connected to the output terminal of the lead-lag network 103, an output terminal of the eighth resistor R8 is connected to an input terminal of the ninth resistor R9 and an input terminal of the fifth capacitor C5 respectively, an output terminal of the ninth resistor R9 is connected to an input terminal of the eleventh resistor R11, an input terminal of the sixth capacitor C6, and a second input terminal of the fourth operational amplifier U4 respectively, an output terminal of the eleventh resistor R11, an output terminal of the sixth capacitor C6, and an output terminal of the fourth operational amplifier U4 are all connected to the input terminal of the gain adjustment circuit 105, one terminal of the tenth resistor R10 is connected to a first input terminal of the fourth operational amplifier U4, and the other terminal of the tenth resistor and an output terminal of the fifth capacitor C5 are both grounded.

A transfer function of the anti-aliasing filter circuit 104 is determined by a formula $$H_{104} = -\frac{1}{R_8 R_{11} C_5 C_6} \cdot \frac{1}{s + \frac{1}{R_9 C_5}} \cdot \frac{1}{s + \frac{1}{R_{11} C_6}},$$

$R_8$ is a value of the eighth resistor R8, $R_9$ is a value of the ninth resistor R9, $R_{11}$ is a value of the eleventh resistor R11, $C_5$ is a value of the fifth capacitor C5, $C_6$ is a value of the sixth capacitor C6, and S is a complex variable, represents a complex frequency, and is obtained by performing Laplace transform on the differential equation of the circuit model.

The ninth resistor R9 and the eleventh resistor R11 are both adjustable resistors. The constraint bandwidth of the output signal can be adjusted by changing the values of the ninth resistor R9 and the eleventh resistor R11. If the sampling frequency of a subsequent digital signal changes, the constraint bandwidth can be adjusted accordingly, which has environmental adaptability.

Further, a method for adjusting the resistance values of the ninth resistor R9 and the eleventh resistor R11 is as follows: according to the subsequent required sampling frequency, the actually required constraint bandwidth, that is, the cut-off frequency, is determined, and the resistance values of the ninth resistor R9 and the eleventh resistor R11 are adjusted to make the cut-off frequency of the anti-aliasing filter circuit 104 consistent with the required cut-off frequency.

Figure 6:
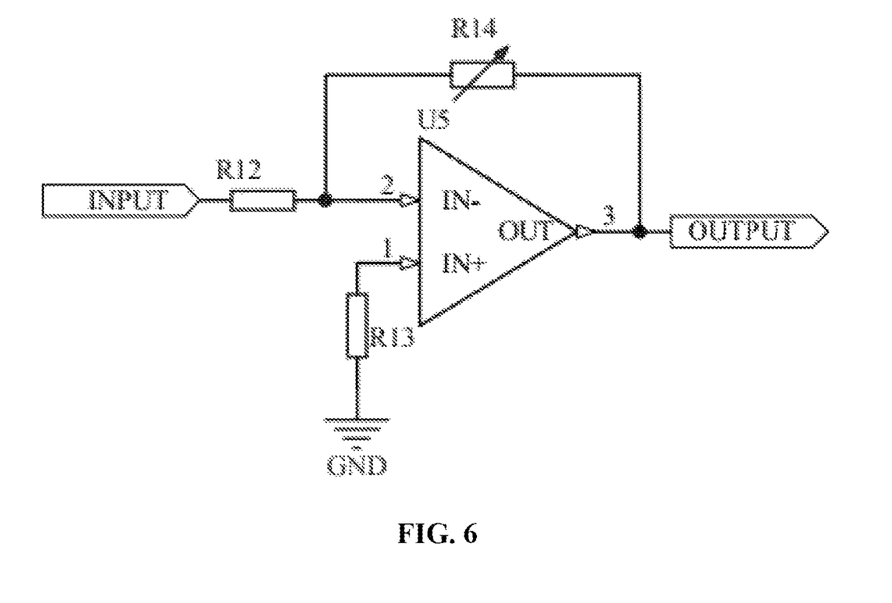
FIG. 6 is a schematic structural diagram of a gain adjustment circuit provided by the present disclosure.

FIG. 6 is a schematic structural diagram of the gain adjustment circuit 105 provided by the present disclosure. As shown in FIG. 6, the gain adjustment circuit 105 includes: a twelfth resistor R12, a thirteenth resistor R13, a fourteenth resistor R14, and a fifth operational amplifier U5. The fourteenth resistor R14 is an adjustable resistor.

An input terminal of the twelfth resistor R12 is connected to the output terminal of the anti-aliasing filter circuit, an output terminal of the twelfth resistor R12 is connected to an input terminal of the fourteenth resistor R14 and a second input terminal of the fifth operational amplifier U5 respectively, an output terminal of the fourteenth resistor R14 is connected to an output terminal of the fifth operational amplifier U5, one terminal of the thirteenth resistor R13 is connected to a first input terminal of the fifth operational amplifier U5, and the other terminal of the thirteenth resistor R13 is grounded.

The fourteenth resistor R14 is an adjustable resistor. The total gain of the circuit can be adjusted by changing the value of the fourteenth resistor R14. In practical application, there are some differences in the sensitivity of each sensor, and gain adjustment can compensate for the sensitivity, achieve uniformity, avoid the impact caused by the differences in the sensitivity, and have good object applicability.

Further, a method for adjusting the resistance value of the fourteenth resistor R14 is as follows: first, sensitivity parameters of the connected sensor are obtained, and the uniform sensitivity required for control is determined, so as to obtain the required total circuit gain value, and then the resistance value of the fourteenth resistor R14 is calculated in combination with the existing circuit gain values of the previous modules.

The present disclosure adds the lead-lag network to the circuit to correct the low-frequency dynamic characteristics of the sensor system, alleviating the amplitude attenuation of the sensor at low frequencies, and correcting the problem of its phase lead. Based on these improvements, in feedforward control, the modeling accuracy of a forward channel of vibration transfer will be improved, the stability of the system will also be improved in feedback control, and the vibration isolation performance of the active vibration reduction system will also be improved accordingly.

The present disclosure designs and realizes the correction of the low-frequency dynamic characteristics of the sensor system based on an analog circuit. Compared with a digital circuit, the analog circuit does not require signal sampling, can avoid quantization noise during sampling of low-frequency signals, improve a signal-to-noise ratio of the low-frequency signals, and can further improve the vibration control effect of active vibration reduction at low frequencies.

The relevant parameters of the transfer function of the lead-lag network are adjustable, that is, a correction link is adjustable. By adjusting the resistance value of the relevant resistor, the corresponding frequency point in the lead-lag network changes, which can solve the low-frequency characteristic changes caused by the aging of the sensor. At the same time, the problem of differences in low-frequency characteristics between individual sensors caused by different sensor designs and processing technology deviations can also be solved, which has universal adaptability.

A gain adjustment link is added to the circuit, which can compensate for the differences in the sensitivity between individual sensors caused by different sensor designs and processing technology deviations, realizes the unification of measurement signals, and can be used in multi-sensor and multi-channel applications.

Each embodiment of this specification is described in a progressive manner, each embodiment focuses on the difference from other embodiments, and the same and similar parts between the embodiments may refer to each other.

Specific examples are used herein to expound the principle and implementations of the present disclosure. The description of these embodiments is merely used to assist in understanding the method of the present disclosure and its core conception. In addition, those of ordinary skill in the art can make modifications in terms of specific implementations and scope of application based on the conception of the present disclosure. In conclusion, the content of this specification should not be construed as a limitation to the present disclosure.

What is claimed is:

1. A signal conditioning system for low-frequency measurement of an acceleration sensor, comprising: a charge integration circuit, a high-pass filter circuit, a lead-lag network, an anti-aliasing filter circuit, and a gain adjustment circuit;

an input terminal of the charge integration circuit is connected to the acceleration sensor, an output terminal of the charge integration circuit is connected to an input terminal of the high-pass filter circuit, an output terminal of the high-pass filter circuit is connected to an input terminal of the lead-lag network, an output terminal of the lead-lag network is connected to an input terminal of the anti-aliasing filter circuit, and an output terminal of the anti-aliasing filter circuit is connected to an input terminal of the gain adjustment circuit;

the charge integration circuit is used to convert a charge signal generated by measurement of the acceleration sensor into a voltage signal for operational amplification; the high-pass filter circuit is used to filter a direct current (DC) component in the voltage signal for the operational amplification; the lead-lag network is used to expand a measurement bandwidth of the acceleration sensor to a low-frequency band; the anti-aliasing filter circuit is used to adjust a constraint bandwidth of an output signal; and the gain adjustment circuit is used to adjust an output gain of the output signal;

the lead-lag network comprises: a second resistor, a third resistor, a third capacitor, a fourth resistor, a fifth resistor, a sixth resistor, a seventh resistor, a fourth capacitor, and a third operational amplifier; and the second resistor, the third resistor, the fifth resistor, and the seventh resistor are all adjustable resistors; and an input terminal of the second resistor is connected to the output terminal of the high-pass filter circuit, an output terminal of the second resistor is connected to an input terminal of the third resistor and an input terminal of the fourth resistor respectively, an output terminal of the third resistor is connected to an input terminal of the third capacitor, an output terminal of the third capacitor is grounded, an output terminal of the fourth resistor is connected to an input terminal of the fifth resistor and a second input terminal of the third operational amplifier respectively, an output terminal of the fifth resistor is connected to an input terminal of the seventh resistor and an input terminal of the fourth capacitor respectively, an output terminal of the seventh resistor and an output terminal of the fourth capacitor are both connected to an output terminal of the third operational amplifier, the output terminal of the third operational amplifier is further connected to the anti-aliasing filter circuit, one terminal of the sixth resistor is connected to a first input terminal of the third operational amplifier, and the other terminal of the sixth resistor is grounded.

2. The signal conditioning system for low-frequency measurement of an acceleration sensor according to claim 1, wherein the charge integration circuit comprises: a first capacitor and a first operational amplifier; and an input terminal of the first capacitor and a second input terminal of the first operational amplifier are both connected to the acceleration sensor, and an output terminal of the first capacitor and an output terminal of the first operational amplifier are both connected to the input terminal of the high-pass filter circuit; and a first input terminal of the first operational amplifier is grounded.

3. The signal conditioning system for low-frequency measurement of an acceleration sensor according to claim 1, wherein the high-pass filter circuit comprises: a second capacitor, a first resistor, and a second operational amplifier; and an input terminal of the second capacitor is connected to the output terminal of the charge integration circuit, an output terminal of the second capacitor is connected to an input terminal of the first resistor and a first input terminal of the second operational amplifier respectively, an output terminal of a first capacitor is grounded, a second input terminal of the second operational amplifier is connected to an output terminal of the second operational amplifier, and the output terminal of the second operational amplifier is further connected to the input terminal of the lead-lag network.

4. The signal conditioning system for low-frequency measurement of an acceleration sensor according to claim 3, wherein a transfer function of the high-pass filter circuit is determined by a formula $$H_{102} = \frac{s}{s + \frac{1}{R_1 C_2}},$$

s is a complex variable, represents a complex frequency, and is obtained by performing Laplace transform on a differential equation of a circuit model, $R_1$ is a value of the first resistor, and $C_2$ is a value of the second capacitor.

5. The signal conditioning system for low-frequency measurement of an acceleration sensor according to claim 1, wherein a transfer function of the lead-lag network is determined by a formula $$H_{103} = \frac{R_3 R_5 C_3}{(R_2 + R_3) R_4 C_3} \cdot \frac{s + \frac{1}{R_3 C_3}}{s + \frac{1}{(R_2 + R_3) C_3}} \cdot \frac{s + \frac{R_5 + R_7}{R_5 R_7 C_4}}{s + \frac{1}{R_7 C_4}},$$

$R_2$ is a value of the second resistor, $R_3$ is a value of the third resistor, $R_4$ is a value of the fourth resistor, $R_5$ is a value of the fifth resistor, $R_7$ is a value of the seventh resistor, $C_3$ is a value of the third capacitor, $C_4$ is a value of the fourth capacitor, and s is a complex variable, represents a complex frequency, and is obtained by performing Laplace transform on a differential equation of a circuit model.

6. The signal conditioning system for low-frequency measurement of an acceleration sensor according to claim 1, wherein the anti-aliasing filter circuit comprises: an eighth resistor, a fifth capacitor, a ninth resistor, a tenth resistor, an eleventh resistor, a sixth capacitor, and a fourth operational amplifier; and the ninth resistor and the eleventh resistor are both adjustable resistors; and an input terminal of the eighth resistor is connected to the output terminal of the lead-lag network, an output terminal of the eighth resistor is connected to an input terminal of the ninth resistor and an input terminal of the fifth capacitor respectively, an output terminal of the ninth resistor is connected to an input terminal of the eleventh resistor, an input terminal of the sixth capacitor, and a second input terminal of the fourth operational amplifier respectively, an output terminal of the eleventh resistor, an output terminal of the sixth capacitor, and an output terminal of the fourth operational amplifier are all connected to the input terminal of the gain adjustment circuit, one terminal of the tenth resistor is connected to a first input terminal of the fourth operational amplifier, and the other terminal of the tenth resistor and an output terminal of the fifth capacitor are both grounded.

7. The signal conditioning system for low-frequency measurement of an acceleration sensor according to claim 6, wherein a transfer function of the anti-aliasing filter circuit is determined by a formula $$H_{104} = -\frac{1}{R_8 R_{11} C_5 C_6} \cdot \frac{1}{s + \frac{1}{R_9 C_5}} \cdot \frac{1}{s + \frac{1}{R_{11} C_6}},$$

$R_8$ is a value of the eighth resistor, $R_9$ is a value of the ninth resistor, $R_{11}$ is a value of the eleventh resistor, $C_5$ is a value of the fifth capacitor, $C_6$ is a value of the sixth capacitor, and s is a complex variable, represents a complex frequency, and is obtained by performing Laplace transform on a differential equation of a circuit model.

8. The signal conditioning system for low-frequency measurement of an acceleration sensor according to claim 1, wherein the gain adjustment circuit comprises: a twelfth resistor, a thirteenth resistor, a fourteenth resistor, and a fifth operational amplifier; and the fourteenth resistor is an adjustable resistor; and an input terminal of the twelfth resistor is connected to the output terminal of the anti-aliasing filter circuit, an output terminal of the twelfth resistor is connected to an input terminal of the fourteenth resistor and a second input terminal of the fifth operational amplifier respectively, an output terminal of the fourteenth resistor is connected to an output terminal of the fifth operational amplifier, one terminal of the thirteenth resistor is connected to a first input terminal of the fifth operational amplifier, and the other terminal of the thirteenth resistor is grounded.

* * * * *